March 15, 1927.  
F. H. TUPPER  
1,621,042

METHOD OF MOLDING STRAIN INSULATORS

Filed March 29, 1924     3 Sheets-Sheet 1

WITNESSES:  
G. S. Neilson  
W. C. Wheeler.

INVENTOR  
Frank H. Tupper  
BY  
Chesley L. Carr  
ATTORNEY

March 15, 1927. 1,621,042
F. H. TUPPER
METHOD OF MOLDING STRAIN INSULATORS
Filed March 29, 1924 3 Sheets-Sheet 2

WITNESSES:
G. S. Neilson.
W. C. Wheeler.

INVENTOR
Frank H. Tupper
BY
Wesley G. Carr
ATTORNEY

March 15, 1927.  1,621,042
F. H. TUPPER
METHOD OF MOLDING STRAIN INSULATORS
Filed March 29, 1924    3 Sheets-Sheet 3

WITNESSES:
G. S. Neilson
W. C. Wheeler

INVENTOR
Frank H. Tupper
BY
Chesley G. Carr
ATTORNEY

Patented Mar. 15, 1927.

1,621,042

UNITED STATES PATENT OFFICE.

FRANK H. TUPPER, OF WILKINSBURG, PENNSYLVANIA, ASSIGNOR TO WESTINGHOUSE ELECTRIC & MANUFACTURING COMPANY, A CORPORATION OF PENNSYLVANIA.

METHOD OF MOLDING STRAIN INSULATORS.

Application filed March 29, 1924. Serial No. 702,726.

My invention relates to molding, and particularly to molding of the type whereby articles are formed under heat and pressure from impregnated sheet material.

One of the objects of my invention is to provide a process of molding a plurality of articles in a single operation under heat and pressure from sheets of impregnated fibrous material.

Another object of my invention is to provide a mold which shall form a plurality of molded articles from the same sheets of impregnated material in a single operation.

My invention is directed to a mold adapted to be used with sheets of impregnated fibrous material, wherein the excess of molding material and the material between the articles molded is pinched off in the molding or curing operation. The finished articles are thereby segregated, and are separated from each other. This process is analogus to "flash molding" in which a readily flowing mixture is used and the excess material is pinched off.

In molding articles from fibrous impregnated materials under heat and pressure, it is the usual practice to cut the sheets of impregnated material to approximately the shape of the finished article and to mold them separately.

The procedure of molding small articles from comminuted molding material is to preform a sheet of the material to facilitate handling and then to mold the articles and cure the binder in a gang mold with heat and pressure. The properties of the article to be molded also depend somewhat on the nature of the impregnated material used. An article molded from fibrous sheet material has great strength and an article made from a comminuted material has a good finish but it does not have a particularly high tensile strength. Consequently, the properties desired in the finished article control to a large measure, both the material to be molded and the method of molding.

For the purpose of molding small objects, such as strain insulators, rods, and the like, where great tensile strength as well as insulating properties are desired, the process of molding each separately from sheets of fibrous material is extremely slow and tedious. My invention avoids the former practice of molding each article separately by employing sheets of impregnated felted fibres and a gang mold whereby articles having great tensile strength may be molded in a manner similar to that used in molding comminuted material.

In the drawings constituting a part hereof, and in which like characters designate like parts, Figure 1 is a view, partially in end elevation, and partially in cross section, of my assembled mold.

Figure 1:
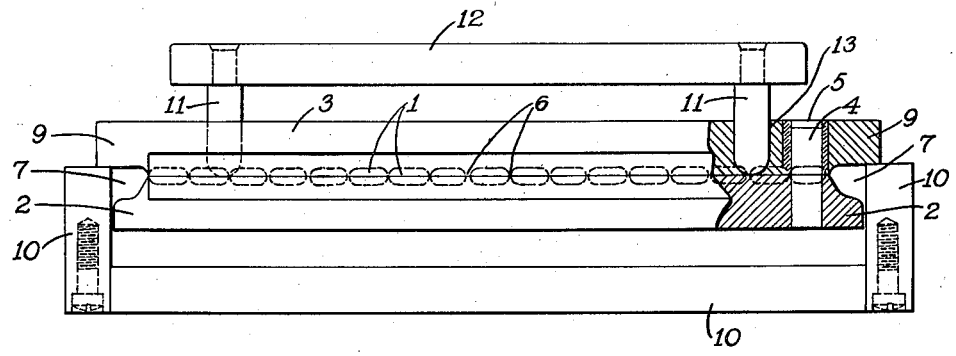
Figure 2:
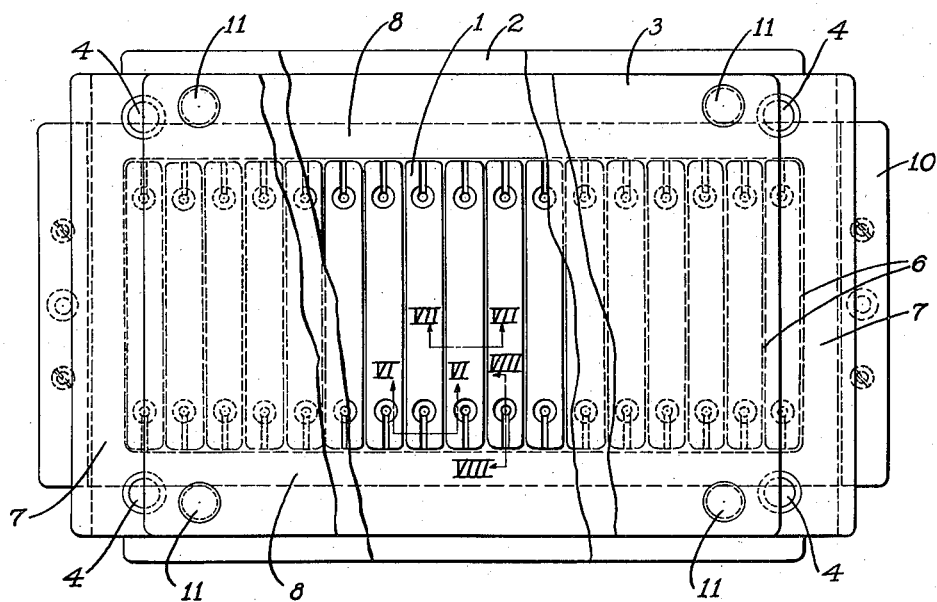
Fig. 2 is a plan view of my mold with a part of the top section broken away.

The mold is so constructed that a plurality of articles 1 may be molded in a single operation and comprises a lower platen or matrix 2 and an upper platen 3, each of which is machined to give the required shape to the finished article.

Pins 4 in the matrix and openings 5 in the upper platen are so located that the two parts of the mold are held in exact alignment. Each section of the mold is surrounded by a narrow partition or separator 6 which serves to pinch off the molding material between the molded articles and at the ends and sides of the mold. Open grooves 7 are formed at the sides between the platens and circular enclosed grooves 8 are formed at the ends of the platens to receive the excess molding material.

In order to separate the platens, I have provided an extension 9 on the upper platen 3 by means of which the assembled mold may be suspended in a standard or yoke 10. Pins 11 in a plate 12 extend through openings 13 in the upper platen 3 and are pressed against the lower platen 2, thereby separating the two parts of the mold.

Figure 3:
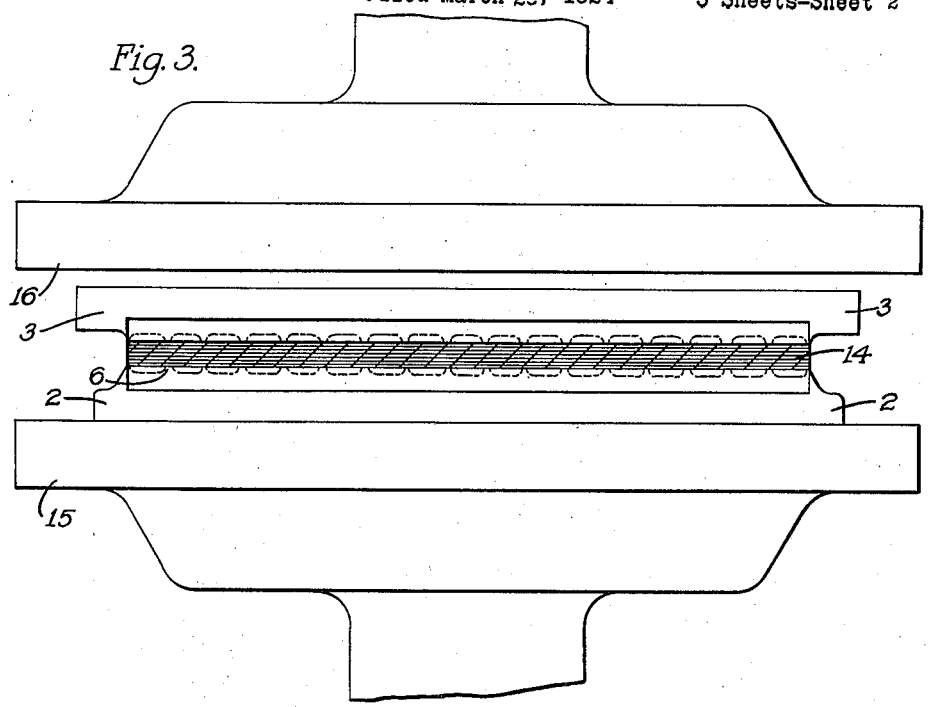
Fig. 3 is an end elevational view of the mold with molding material therein prior to the molding operation.
Figure 4:
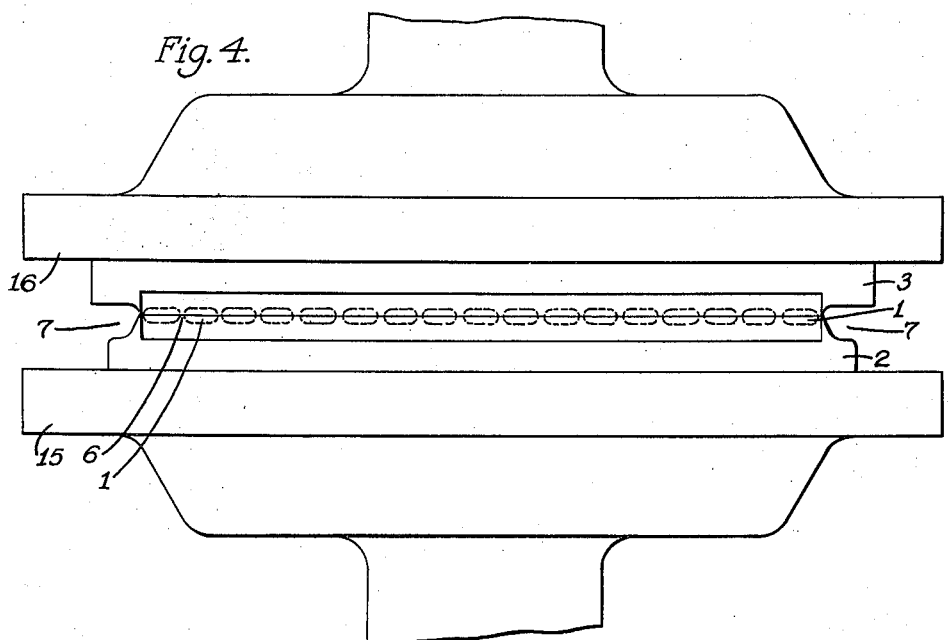
Fig. 4 is a view, similar to Fig. 3 but with the mold in closed position.
Figure 5:
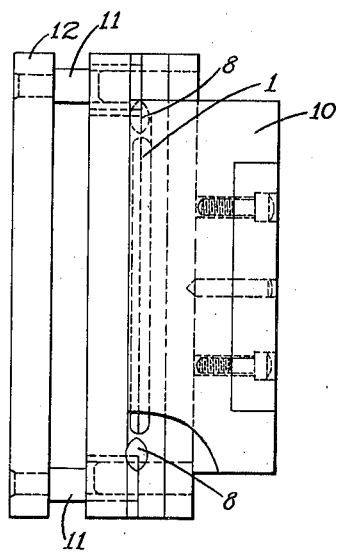
Fig. 5 is a side elevational view of the mold in closed position.
Figure 6:
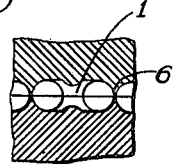
Fig. 6 is a fragmentary cross sectional view taken on the line VI—VI of Fig. 2.
Figure 7:
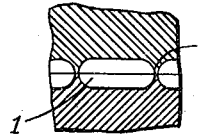
Fig. 7 is a fragmentary cross sectional view taken on the line VII—VII of Fig. 2.
Figure 8:
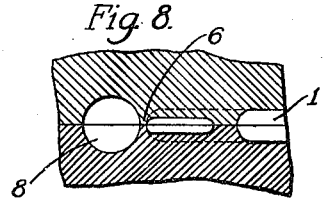
Fig. 8 is a fragmentary cross sectional view taken on the line VIII—VIII of Fig. 2.

I have found that an impregnated cotton felt is suitable for use in my process, although any fibrous felt material which is capable of being pinched off in the molding operation may be used. The impregnated felted material 14 is placed between the platens, as shown in Fig. 3. When the plates are pressed together by means of the press platens 15 and 16, the impregnated material is caused to fill each individual mold. The edges of the upper and lower separators 6 simultaneously pinch the material between the same. The application of heat and pressure causes the binder to soften and the separators then pinch off the molded material. The further application of heat cures the phenolic condensation product and results in an article having a finished appearance.

Figure 9:
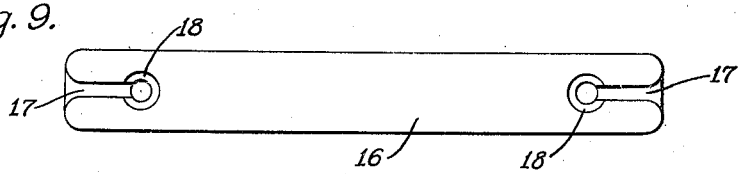
Fig. 9 is a plan view of a strain insulator formed in the mold.
Figure 10:
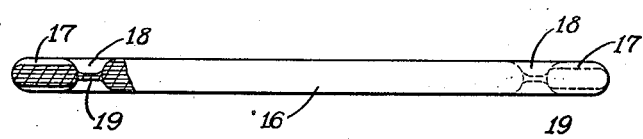
Fig. 10 is a view, partially in elevation and partially in cross section, of the strain insulator.

The mold illustrated is for forming a plurality of strain insulators. The insulators 16, Fig. 9, is provided at each end with a longitudinal groove 17 extending inwardly as far as the round indented portions 18 near the ends thereof. When molded, a thin diaphragm 19 which remains in each of the round indented portions, is afterwards punched or drilled out.

I have provided a process of forming a plurality of articles from sheets of impregnated fibrous material with heat and pressure which comprises using a material capable of being pinched off when subjected to heat and pressure and using a gang mold whereby each finished article is separated in the molding operation.

Although I have described a specific embodiment of my invention, I do not wish to limit it thereto. For example, I have specifically described a mold for small flat strain insulators, but the process may be applied to other shapes, such as rods. Instead of a cotton felted material which is impregnated with a phenolic condensation product, I may use other felted material capable of being pinched off in a mold, or any other binder capable of being cured under heat and pressure, such as shellac. Still other modifications will readily suggest themselves to those skilled in the art, without departing from the spirit of my invention, the scope of which is set forth in the annexed claims.

I claim as my invention:

1. The process of forming a plurality of articles in one operation which comprises compressing felted sheet material impregnated with a binder capable of being cured under heat and pressure in a mold, segregating said articles in said molding operation and applying heat and pressure to harden said binder.

2. The process of forming a plurality of articles in one operation which comprises compressing felted cotton material impregnated with a binder capable of being cured under heat and pressure in a mold, segregating said articles in said molding operation and applying heat and pressure to harden said binder.

3. The process of forming a plurality of articles in one operation which comprises compressing felted spinnable sheet material impregnated with a binder capable of being cured under heat and pressure in a mold, segregating the excess of said felted material, pinching said felted material to separate said articles in the molding operation and applying heat and pressure to harden said binder.

4. The process of forming a plurality of articles in one operation which comprises compressing felted sheet cotton impregnated with a binder capable of being cured under heat and pressure in a mold, segregating the excess of said felted material, pinching said felted material to separate said articles in the molding operation and applying heat and pressure to harden said binder.

5. The process of forming a plurality of articles in one operation which comprises compressing felted sheet material impregnated with a phenolic condensation product in a mold, segregating said articles in the forming operation and applying heat and pressure to harden said condensation product.

6. The process of forming a plurality of articles in one operation which comprises compressing in a mold felted spinnable fibres impregnated with a phenolic condensation product, segregating said articles in said forming operation and applying heat and pressure to harden said phenolic condensation product.

7. The process of forming a plurality of articles in one operation which comprises compressing in a mold felted sheet cotton impregnated with a phenolic condensation product, segregating said articles in said forming operation and applying heat and pressure to harden said phenolic condensation product.

8. The process of forming a plurality of articles in one operation which comprises compressing in a mold spinnable felted material impregnated with a phenolic condensation product, segregating the excess of said felted material, pinching said felted material in the molding operation to segregate said articles, and applying heat and pressure to harden said binder.

In testimony whereof, I have hereunto subscribed my name this 20th day of March, 1924.

FRANK H. TUPPER.